UNITED STATES PATENT OFFICE.

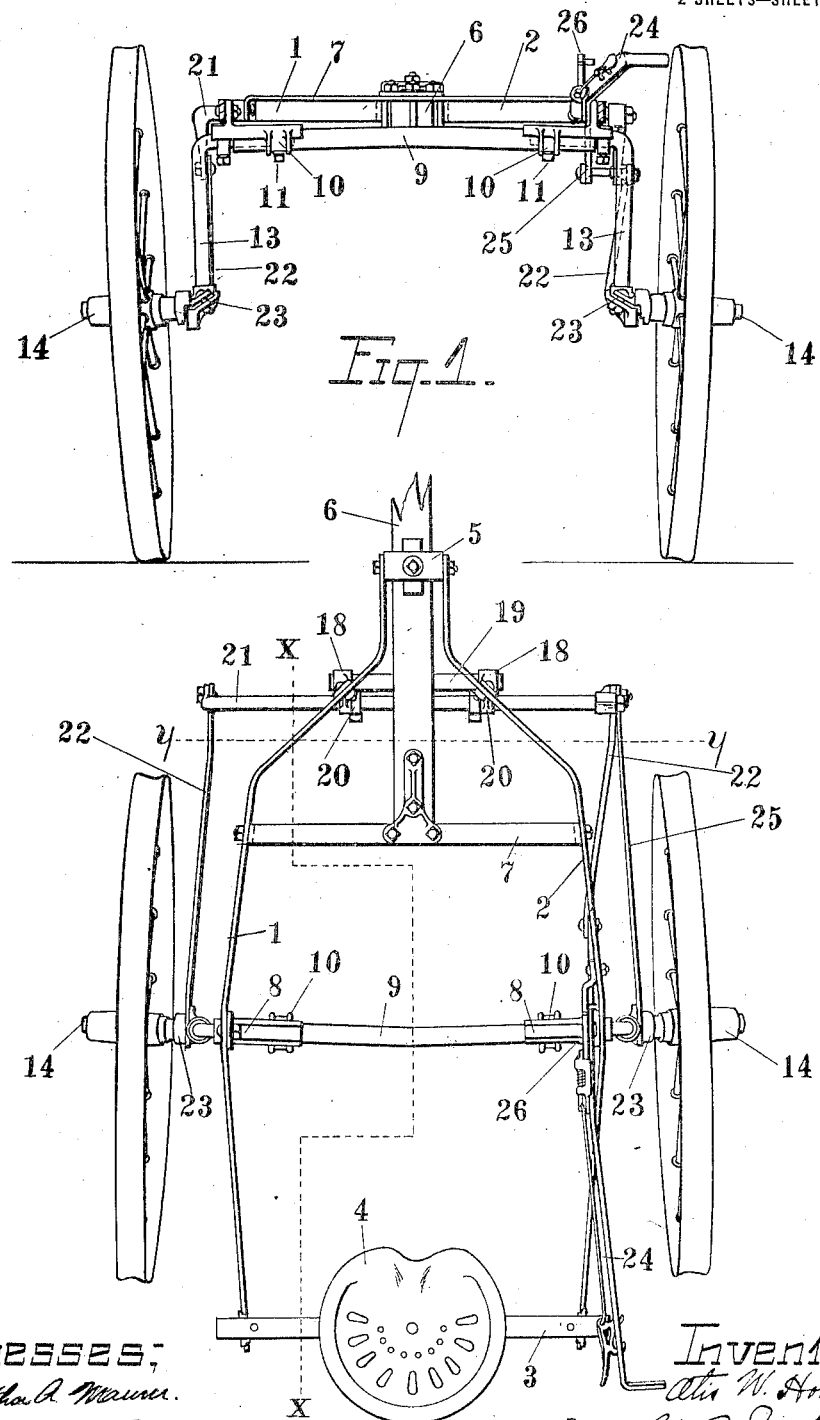

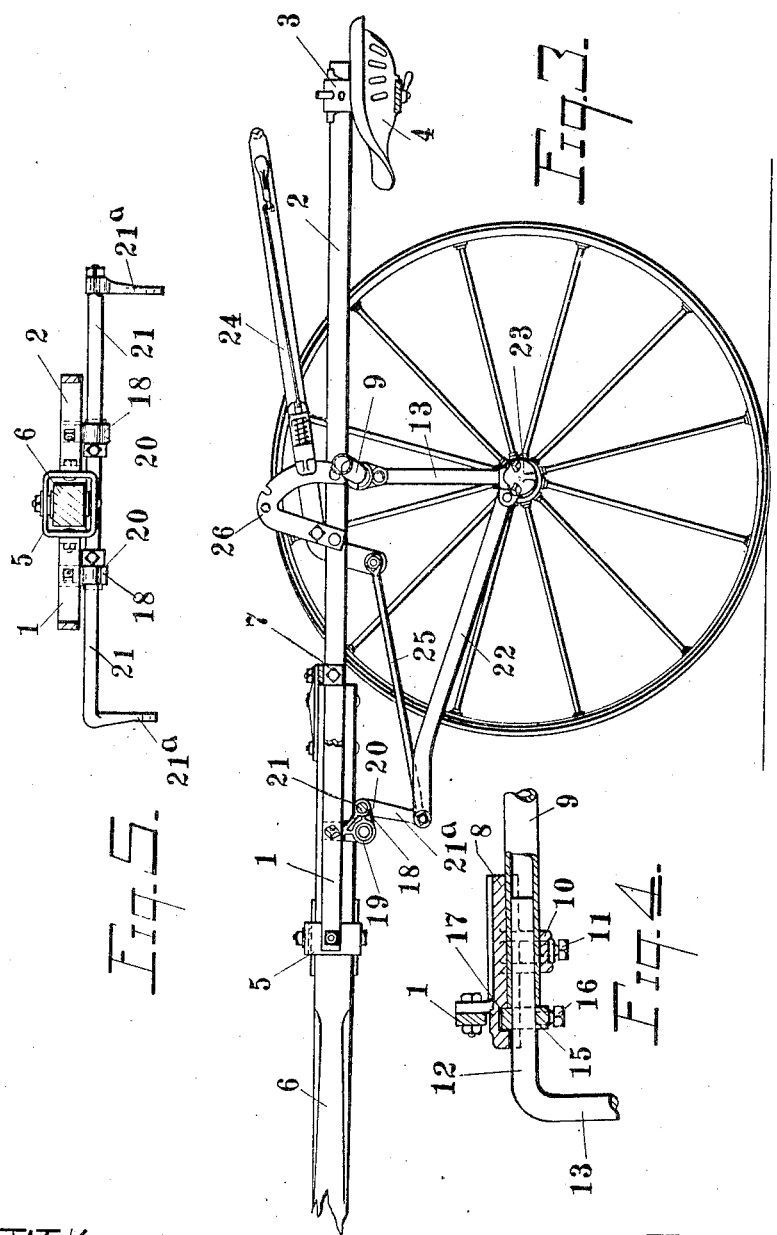

OTIS W. HOWARD, OF MOLINE, ILLINOIS, ASSIGNOR TO DEERE & COMPANY, OF MOLINE, ILLINOIS, A CORPORATION OF ILLINOIS.

CULTIVATOR-WHEEL ADJUSTMENT.

1,346,318.   Specification of Letters Patent.   Patented July 13, 1920.

Application filed October 7, 1912, Serial No. 724,353. Renewed May 31, 1916. Serial No. 100,967.

*To all whom it may concern:*

Be it known that I, OTIS W. HOWARD, a citizen of the United States, residing at Moline, in the county of Rock Island and State of Illinois, have invented certain new and useful Improvements in Cultivator-Wheel Adjustments, of which the following is a specification, reference being had therein to the accompanying drawing.

My invention relates to wheeled cultivators, and particularly to means employed for adjustment of the supporting wheels.

The object of my invention is to provide a cultivator having adjustable supporting wheels with both pitch and gather, and to provide means by which the pitch and gather can be adjusted to a desired degree and the pitch and gather retained constant during the adjustment of the supporting wheels either forward or rearward.

Referring to the drawings in which similar numerals indicate identical parts—

Figure 1 is a rear elevation of a cultivator frame in which the seat and its support has been omitted. Fig. 2 is a plan of the cultivator-frame complete. Fig. 3 is a section on the line $x$—$x$ of Fig. 2. Fig. 4 is a detail, and Fig. 5 is a section on line $y$—$y$ of Fig. 2.

In implements of this class, a pitch and gather to the wheels is a feature of material advantage, adding considerably to the life of the machine by lessening wear of the parts and decreasing the draft. The pitch and gather of the wheels should be preserved and its degree regulated, and to accomplish this I employ the following mechanism: The main-frame of the cultivator consists of side-bars 1 and 2, upon the rear ends of which is secured a seat-bar 3 with a seat 4 mounted thereon. The forward ends of the side-bars 1 and 2 converge to a pole iron 5 to which they are rigidly attached. The pole 6 extends rearwardly from the pole iron 5, its rearward end being secured to a bar 7 which forms part of the frame, extending laterally thereof, and bolted to the side-bars 1 and 2.

The main-frame is rigidly bolted or otherwise secured to castings 8. A bent cross-bar or preferably tubular member 9 has its end portions adjustably held in the castings 8 by means of collars 10 and set-screws 11, the collars 10 being preferably integral with the castings 8. Journaled in each end of the cross-bar 9 is the upper portion 12 of a crank-axle having a vertical portion 13 and a lower portion 14, the portions 12 and 14 being preferably parallel and at right angles with the vertical portion 13. The portion 12 of each of the crank-axles is held in position in the cross-bar 9 by a collar 15 which is secured on the portion 12 by a set screw or bolt 16, each collar 15 engaging with a recess 17 in the castings 8. Supporting-wheels are journaled on the lower portion 14 of each crank-axle.

Supported on brackets 18, on converging portion of the frame-bars 1 and 2, is a bar 19, preferably tubular; each of the brackets 18 has a rearwardly projecting arm 20 in which is journaled a rocking-bar 21 having depending-end portions 21$^a$ bent substantially at a right angle thereto, and pivotally connected with links 22 which extend rearwardly and are pivotally attached to castings 23 secured on the lower portion of the vertical part 13 of each crank-axle.

On one of the side-bars of the main-frame, in this instance the side-bar 2, is pivoted a hand-lever 24, convenient to the seat 4, and having the portion below the pivot bent downwardly and connected by a link 25 with an end portion 21$^a$ of the rocking-bar 21. The hand-lever 24 is provided with the usual latch and dog to engage with a segment 26.

The supporting-wheels are mounted on the machine with a downward gather or pitch, as shown in the drawings, therefore the tread of each wheel is at an angle to the ground; the weight of the driver, however, through the resiliency of the cross-pipe 9 and the crank-axles, practically eliminates the pitch, the wheels then are liable to flare outwardly through the power of the draft, and it is necessary to provide a forward gather of the wheels to overcome this flaring tendency, to preserve lightness of draft and durability of the parts. As previously stated the cross-bar 9 is bent, and as mounted on the machine the bend is upward; when the bend is in a vertical plane, the downward gather or pitch of the supporting-wheels is at a maximum, and no gather of the wheels forwardly could result, conversely it follows that if the cross-bar 9 was adjusted rearwardly so that the bend would be in a horizontal plane, any downward gather or pitch of the supporting-wheels would be absent and the forward gather would be at its greatest degree. I find in practice that by adjusting the cross-bar 9 so that it will have a rearward inclination, at an angle to a transverse vertical plane of the main frame, as shown in the drawings, and more particularly in Fig. 3, I secure the best results. The cross-bar 9 is adjusted to the desired position by loosening the set screws 11 and turning the cross-bar 9 in the castings 10 until the desired rearward inclination is obtained, when the set-screws are again tightened holding the cross-bar 9 rigidly.

It will be understood that the degree of the forward gather as well as the downward gather or pitch of the supporting-wheels is determined by the position of the cross-bar 9.

The operation of the hand-lever 24, from the position shown in the drawings, upwardly and forwardly will rock the crank-axles, moving the supporting-wheels rearwardly, and the weight of the driver forwardly, preserving the balance of the implement without disturbing either the forward gather or the downward pitch of the supporting-wheels which is constant after adjustment is once made. The width between the supporting-wheels can be varied by turning the bolts 16 until the part 12 of the crank-axles is free to be moved laterally of the machine, to the desired adjustment where it is secured by tightening the bolts 16. It will be noted that the crank-axles are identically alike and are consequently interchangeable.

What I claim is—

1. In a cultivator, the combination of a main frame, crank axles having upper and lower portions substantially parallel to each other, the upper portions of the crank axles supported on the main frame angular to the horizontal plane of the main frame, and supporting wheels on the lower portions of the crank axles.

2. In a cultivator, the combination of a main frame, crank axles having upper and lower portions substantially parallel to each other, the upper portions of the crank axles supported on the main frame angular to a transverse vertical plane of the main frame, and supporting wheels on the lower portions of the crank axles.

3. In a cultivator, the combination of a main frame, crank axles having upper and lower portions substantially parallel to each other, the upper portions of the crank axles supported on the main frame angular to the horizontal plane of the main frame and angular to a transverse vertical plane of the main frame, and supporting wheels on the lower portions of the crank axles.

4. In a cultivator, the combination of a main frame, crank axles having upper and lower portions substantially parallel to each other, the upper portions of the crank axles pivotally supported on the main frame angular to the horizontal plane of the main frame, supporting wheels on the lower portions of the crank axles, and a lever operable to adjust the crank axles forwardly and rearwardly relatively to the main frame.

5. In a cultivator, the combination of a main frame, crank axles having upper and lower portions substantially parallel to each other, the upper portions of the crank axles pivotally supported on the main frame angular to the horizontal plane of the main frame and angular to a transverse vertical plane of the main frame, supporting wheels on the lower portions of the crank axles, and a lever operable to adjust the crank axles forwardly and rearwardly relatively to the main frame.

6. In a cultivator, the combination of a main frame, crank axles having upper and lower portions substantially parallel with each other, supporting wheels on the lower portions of the crank axles, the upper portions of the crank axles pivotally supported on the main frame angular to the horizontal plane of the main frame whereby the wheels are given a downward pitch, and a lever operable to adjust the crank axles forwardly and rearwardly, the pitch remaining constant during said adjustment.

7. In a cultivator, the combination of a main frame, crank axles having upper and lower portions substantially parallel with each other, supporting wheels on the lower portions of the crank axles, the upper portions of the crank axles pivotally supported on the main frame angular to a transverse vertical plane of the main frame whereby the wheels are given a forward gather, and a lever operable to adjust the crank axles forwardly and rearwardly, the gather remaining constant during said adjustment.

8. In a cultivator having in combination a main frame, a bent tubular cross bar adjustably mounted on the main frame, crank axles journaled in said cross bar and having upper and lower portions substantially parallel, supporting wheels mounted on the lower portions of the crank axles, and a lever operable to rock said crank axle to move said supporting wheels forwardly or rearwardly, said cross bar adapted to be adjusted to gather said wheels forwardly, said gather being constant during the forward or rearward adjustment of said supporting wheels.

9. In a cultivator having in combination a main frame, a bent tubular cross bar adjustably mounted on the main frame, crank axles journaled in said cross bar and having upper and lower portions substantially parallel, supporting wheels mounted on the lower portions of the crank axles, and a lever operable to rock said crank axles to move said supporting wheels forwardly or rearwardly, said cross bar adapted to be adjusted to give a downward pitch to said wheels, said downward pitch being constant during the forward or rearward adjustment of said supporting wheels.

10. In a cultivator having in combination a main frame, a bent tubular cross bar adjustably mounted on the main frame, crank axles journaled in said cross bar and having upper and lower portions substantially parallel, supporting wheels mounted on the lower portions of the crank axles, and a lever operable to rock said crank axles to move said supporting wheels forwardly or rearwardly, said cross bar adapted to be adjusted to gather said wheels forwardly and to give them a downward pitch, said gather and pitch being constant during the forward or rearward adjustment of said supporting wheels.

11. In a cultivator having in combination a main frame, a bent tubular cross bar adjustably mounted on the main frame, crank axles adjustably journaled in said cross bar, each crank axle having upper and lower portions substantially parallel and at right angles to the central portion, supporting-wheels mounted on the lower portions of the crank axles, a rocking bar suitably journaled on the main frame and having depending end portions, links connecting said depending end portions with the crank axles, and a lever mounted on the main frame and connected with said rocking arm to operate the latter to move the supporting wheels forward or rearward.

12. In a cultivator having a main frame, the combination with a bent tubular cross bar extending from one side of the cultivator to the other, crank axles having upper and lower portions, the upper portions of said crank axles journaled in the ends of the tubular cross bar, supporting wheels on the lower portions of said axles, and a lever operable to gather said wheels forwardly by adjustment of the cross bar.

13. In a cultivator having a main frame, the combination with a bent tubular cross bar extending from one side of the cultivator to the other, crank axles having upper and lower portions, the upper portions of said crank axles journaled in the ends of the tubular cross bar, supporting wheels on the lower portions of said axles, said cross bar adapted to be adjusted to give said wheels a downward pitch.

14. In a cultivator having a main frame, the combination with a bent tubular cross bar extending from one side of the cultivator to the other, crank axles having upper and lower portions, the upper portions of said crank axles journaled in the ends of the tubular cross bar, supporting wheels on the lower portions of said axles and gathered forwardly, said cross bar adapted to be adjusted to give said wheels a forward gather and a downward pitch.

15. In a cultivator having a main frame, the combination with a bent tubular cross bar extending from one side of the cultivator to the other, the central portion of said cross bar being higher than the ends, crank axles having upper and lower portions, the upper portions of said crank axles journaled in the ends of the tubular cross bar, supporting wheels on the lower portions of said axle, said cross bar adapted to be adjusted to gather said wheels forwardly.

16. In a cultivator having a main frame, the combination with a bent tubular cross bar extending from one side of the cultivator to the other, the central portion of said cross bar being higher than the ends, crank axles having upper and lower portions, the upper portions of said crank axles journaled in the ends if the tubular cross bar, supporting wheels on the lower portions of said axle, said cross bar adapted to be adjusted to give said wheels a downward pitch.

17. In a cultivator having a main frame, the combination with a bent tubular cross bar extending from one side of the cultivator to the other, the central portion of said cross bar being higher than the ends, crank axles having upper and lower portions, the upper portions of said crank axles journaled in the ends of the tubular cross bar, supporting wheels on the lower portions of said axle, said cross bar adapted to be adjusted to give said wheels a forward gather and a downward pitch.

18. In a cultivator having a main frame, the combination with a bent tubular cross bar adjustably mounted thereon and extending from one side of the cultivator to the other, the central portion of said cross bar being higher than the ends, crank axles having upper and lower portions, the upper portions of said crank axles journaled in the ends of the tubular cross bar, supporting wheels on the lower portion of said axles, and a lever operable to swing the axles forwardly or rearwardly.

In testimony whereof I affix my signature, in presence of two witnesses.

OTIS W. HOWARD.

Witnesses:
BERTHA A. MAURER,
WAYNE G. DUFFIELD.